(12) United States Patent
Rogers (10) Patent No.: US 12,219,951 B2
(45) Date of Patent: Feb. 11, 2025

(54) HANDHELD VACUUM ASSEMBLY FOR THE CAPTURE AND COLLECTION OF INSECTS

(71) Applicant: Brian Rogers, Clearwater, FL (US)

(72) Inventor: Brian Rogers, Clearwater, FL (US)

( * ) Notice: Subject to any disclaimer, the term of this patent is extended or adjusted under 35 U.S.C. 154(b) by 0 days.

(21) Appl. No.: 18/714,841

(22) PCT Filed: Jan. 16, 2024

(86) PCT No.: PCT/US2024/011677
§ 371 (c)(1),
(2) Date: May 30, 2024

(87) PCT Pub. No.: WO2024/152055
PCT Pub. Date: Jul. 18, 2024

(65) Prior Publication Data
US 2024/0415107 A1  Dec. 19, 2024

Related U.S. Application Data (60) Provisional application No. 63/438,815, filed on Jan. 13, 2023.

(51) Int. Cl.
*A01M 3/00* (2006.01)
*A47L 7/00* (2006.01)
(Continued)

(52) U.S. Cl.
CPC ........... *A01M 3/005* (2013.01); *A47L 7/0085* (2013.01); *A47L 9/0693* (2013.01); *A47L 9/122* (2013.01);
(Continued)

(58) Field of Classification Search
CPC .............................. A01M 3/005; A47L 7/0085
See application file for complete search history.

(56) References Cited

U.S. PATENT DOCUMENTS 3,750,327 A * 8/1973 Thybault ................ A01M 1/06
43/139
3,965,608 A   6/1976 Schuman
(Continued)

FOREIGN PATENT DOCUMENTS

GB        2352384 A * 1/2001 .............. A01M 1/06

*Primary Examiner* — Richard G Davis
(74) *Attorney, Agent, or Firm* — Johnson | Dalal; Mark C. Johnson (57) ABSTRACT

A handheld vacuum assembly for the capture and collection of small insects that includes a vacuum body defining a suction chamber, a motor operably configured to generate a vacuum downstream in the suction chamber, a funnel member defining a suction channel located downstream of the suction chamber and a suction channel area therein, a valve disposed within the suction channel that is configured to open and close to inhibit or prevent insects from leaving the funnel member, and a filter assembly disposed upstream of the suction channel, downstream of the motor, having a porous membrane member, having a filter cap selectively removably coupled to the porous membrane member and having a plurality of selectively removable strips disposed thereon and each having an adhesive surface oriented in a direction facing the distal tip of the funnel member.

18 Claims, 7 Drawing Sheets

(51) Int. Cl.
*A47L 9/06* (2006.01)
*A47L 9/12* (2006.01)
*A47L 9/14* (2006.01)
*A47L 9/24* (2006.01)
*A47L 9/28* (2006.01)

(52) U.S. Cl.
CPC ............ *A47L 9/127* (2013.01); *A47L 9/1454* (2013.01); *A47L 9/248* (2013.01); *A47L 9/2884* (2013.01)

(56) References Cited

U.S. PATENT DOCUMENTS

| | | | |
|---|---|---|---|
| 4,282,673 | A | 8/1981 | Focks et al. |
| 4,817,330 | A * | 4/1989 | Fahringer ............... A01M 1/14 43/139 |
| 5,052,147 | A | 10/1991 | Broomfield et al. |
| 5,175,960 | A | 1/1993 | Wade et al. |
| 5,240,479 | A | 8/1993 | Bachinski |
| 7,501,003 | B2 | 3/2009 | Muller et al. |
| 2,481,975 | A1 | 1/2012 | Darby |
| 8,595,894 | B1 * | 12/2013 | Kakish ...................... A47L 5/24 15/352 |
| 8,595,984 | B1 | 12/2013 | Kakish |
| 10,881,094 | B2 | 1/2021 | Guo |
| 2020/0046186 | A1 * | 2/2020 | Woodbury ............... A47L 9/02 |
| 2021/0153706 | A1 * | 5/2021 | Reeder ..................... A47L 9/22 |
| 2022/0202263 | A1 * | 6/2022 | Weinstock .......... A63H 33/305 |
| 2022/0232814 | A1 * | 7/2022 | Lavoie ................. A01M 3/005 |

* cited by examiner

HANDHELD VACUUM ASSEMBLY FOR THE CAPTURE AND COLLECTION OF INSECTS

FIELD OF THE INVENTION

The present invention relates to devices and methods for capturing insects and, more specifically, is directed toward a portable and handheld vacuum assembly for capturing and collective insects.

BACKGROUND OF THE INVENTION

There are many known devices for capturing, collecting, and/or killing insects. This is principally because insects are a continuous nuisance for many individuals and businesses. Some known insects and other similar living organisms proliferate the spread of bacteria and other harmful matter. The capture, collection, and disposal of small insects in particular is often a difficult task or at least one that existing devices are ill-suited to address.

Some known devices utilize a multi-chamber vacuum-induced method that kills or captures the insects inside of the device. These known devices often become ineffective or malfunction due to the insects preventing a high enough vacuum pressure once captured or killed. Further, cleaning and maintaining the device is also time consuming and dirty. Other known devices are very complex in their design, making them costly to manufacture and maintain. Some known devices also employ excessively powerful motors to generate a vacuum that requires the device to be plugged in to work properly. This makes utilizing the device inconvenient or impossible for many users.

Therefore, a need exists to overcome the problems with the prior art as discussed above.

SUMMARY OF THE INVENTION

The invention provides a handheld vacuum assembly for the capture and collection of insects that overcomes the hereinafore-mentioned disadvantages of the heretofore-known devices and methods of this general type and that effectively, safely, and conveniently collect, store, and dispose of insects. More specifically, the present invention makes capturing and collecting small insects and other similar living organisms ("insects") easier, faster, and more convenient than any known device.

With the foregoing and other objects in view, there is provided, in accordance with the invention, a handheld vacuum assembly for the capture and collection of small insects that includes a vacuum body having a handle member and defining a suction chamber, a motor coupled to the vacuum body and operably configured to generate a vacuum downstream in the suction chamber, a battery coupled to the vacuum body and electrically coupled to the motor, a funnel member coupled to the vacuum body, having a distal tip defining a funnel opening, and defining a suction channel spanning from the funnel opening, located downstream of the suction chamber, and defining a suction channel diameter and a suction channel area that is a function of the suction channel diameter, a valve disposed within the suction channel and operably configured to have an open position along a valve translation path and a closed position along the valve translation path with the valve blocking a greater amount of the suction channel area than when the open position, and also a filter assembly disposed upstream of the suction channel, downstream of the motor, having a porous membrane member, having a filter cap selectively removably coupled to the porous membrane member and having a plurality of selectively removable strips disposed thereon and each having an adhesive surface oriented in a direction facing the distal tip.

In accordance with another feature, an embodiment of the present invention includes the funnel member also having a first end opposing the distal tip of the funnel member and a funnel length separating the first end and the distal tip of the funnel member, wherein the funnel member is of a conical shape with a diameter at the distal tip greater than a diameter of the funnel member at the first end.

In accordance with a further feature of the present invention, the distal tip is of a deformably resilient polymeric material.

In accordance with an additional feature of the present invention, the filter cap is selectively removably coupled to the porous membrane member with a hook-and-loop coupling configuration.

In accordance with yet another feature, an embodiment of the present invention also includes an annular upper surface of the porous membrane member and defining an upper aperture, a meshed filtering grate disposed in the upper aperture of the porous membrane member, and an annular bottom surface of the cap defining a bottom aperture with the meshed filtering grate disposed therein, wherein the annular upper surface of the porous membrane member and the annular bottom surface of the cap are selectively removably coupled in the hook-and-loop coupling configuration.

In accordance with a further feature of the present invention, the plurality of selectively removable strips are each of a diameter corresponding with a diameter of the suction chamber. Further, each of the plurality of selectively removable strips may define an aperture with a meshed filtering grate disposed therein.

In accordance with an additional feature of the present invention, the valve is coupled to a handle member projecting outwardly from an outer surface of the funnel member and operably configured to manually place the valve in the valve translation path.

In accordance with an additional feature of the present invention, the valve also includes a plurality of valve flaps inherently biased in the closed position and operably configured to be placed in the open position when the motor generates the vacuum downstream in the suction chamber.

Also in accordance with present invention, a handheld vacuum assembly for the capture and collection of small insects is disclosed that includes a vacuum body having a handle member and defining a suction chamber, an electrical motor coupled to the vacuum body and operably configured to generate a vacuum downstream in the suction chamber, a funnel member coupled to the vacuum body, having a distal tip defining a funnel opening, and defining a suction channel spanning from the funnel opening and located downstream of the suction chamber, and a filter assembly disposed upstream of the suction channel, downstream of the motor, having a porous membrane member, having a filter cap selectively removably coupled to the porous membrane member and having a plurality of selectively removable strips disposed thereon and each having an adhesive surface oriented in a direction facing the distal tip, each defining an aperture with a meshed filtering grate disposed therein, and each of a diameter corresponding with a diameter of the suction chamber.

Although the invention is illustrated and described herein as embodied in a handheld vacuum assembly for the capture and collection of insects, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the vacuum device, or in the direction of airflow toward the motor generating the vacuum within the device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms. It should be understood that terms such as, "front," "rear," "side," top," "bottom," and the like are indicated from the reference point of a viewer viewing the assembly in the figures.

Figure 1:
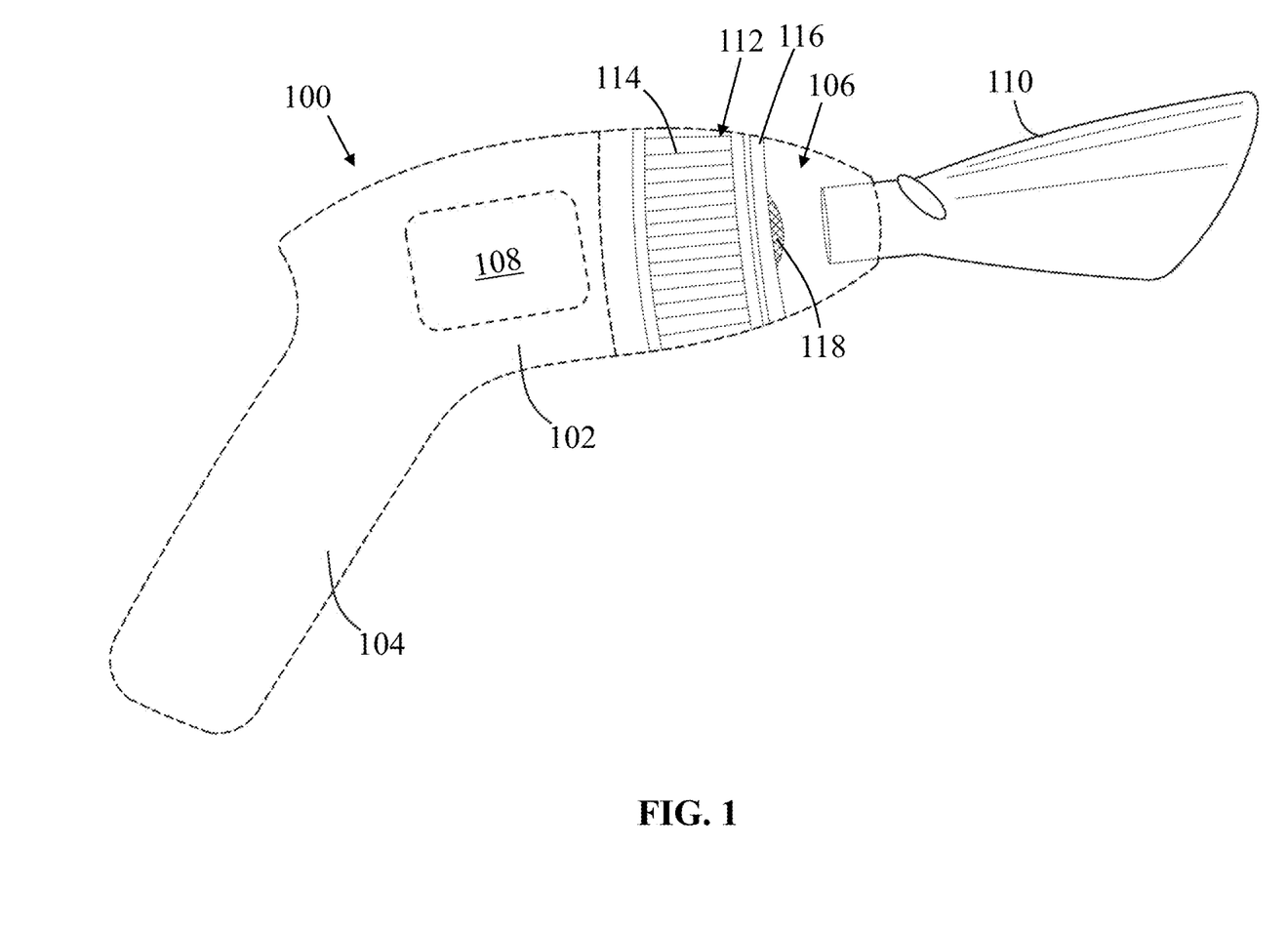
FIG. 1 depicts a perspective view of a handheld vacuum assembly in accordance with one embodiment of the present invention.
Figure 13:
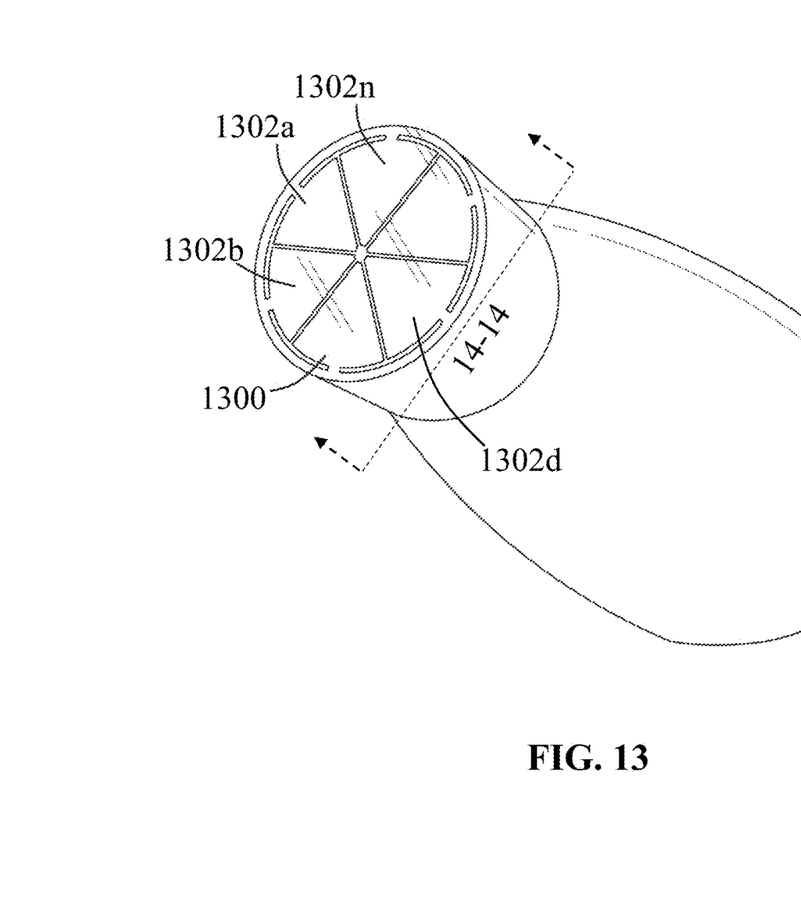
FIG. 13 depicts a perspective view of a funnel member utilized with the handheld vacuum assembly in accordance with another embodiment of the present invention.

The present invention provides a novel and efficient handheld vacuum assembly for the capture and collection of small insects. Referring now to FIG. 1, one embodiment of the present invention is shown in a perspective view. The figures depicted herein show several advantageous features of the present invention, but, as will be described below, the invention can be provided in several shapes, sizes, combinations of features and components, and varying numbers and functions of the components. The first example of a handheld vacuum assembly 100 as shown in FIG. 1, includes a vacuum body 102 configured to induce a vacuum and that is attached to a removable or non-removable funnel member 110. The funnel member 110 may be configured as depicted in FIG. 1 or, alternatively, may be configured as depicted in FIG. 13 (in addition to other alternative embodiments). Beneficially, the handheld vacuum assembly 100 of the present invention utilizes a filter assembly 112 configured to effectively retain the vacuumed insects and quickly, safely, and cleanly dispose of the insects.

The vacuum body 102 and funnel member 110 are preferably of a lightweight yet rigid material, e.g., acrylic, polycarbonate, etc., such that the body 102 and funnel member 110 can maintain their shape upon being grasped and utilized by a user during conventional use. With reference to FIG. 1 in combination with the schematic block diagram of FIG. 15, the vacuum body 102 may house a motor 108 that is coupled to the vacuum body 102 and operably configured to generate a vacuum downstream in the suction chamber 106 defined by the vacuum body 102. The vacuum body 102 may also house a battery 1500 coupled to the vacuum body 102 and that is electrically coupled to the motor 108. The vacuum body 102 may also house a controller 1502 that is configured to selectively control the motor 108. The vacuum body 102 may also include a switch 1504 configured to selectively control the operation and/or intensity of the motor 108.

Figure 15:
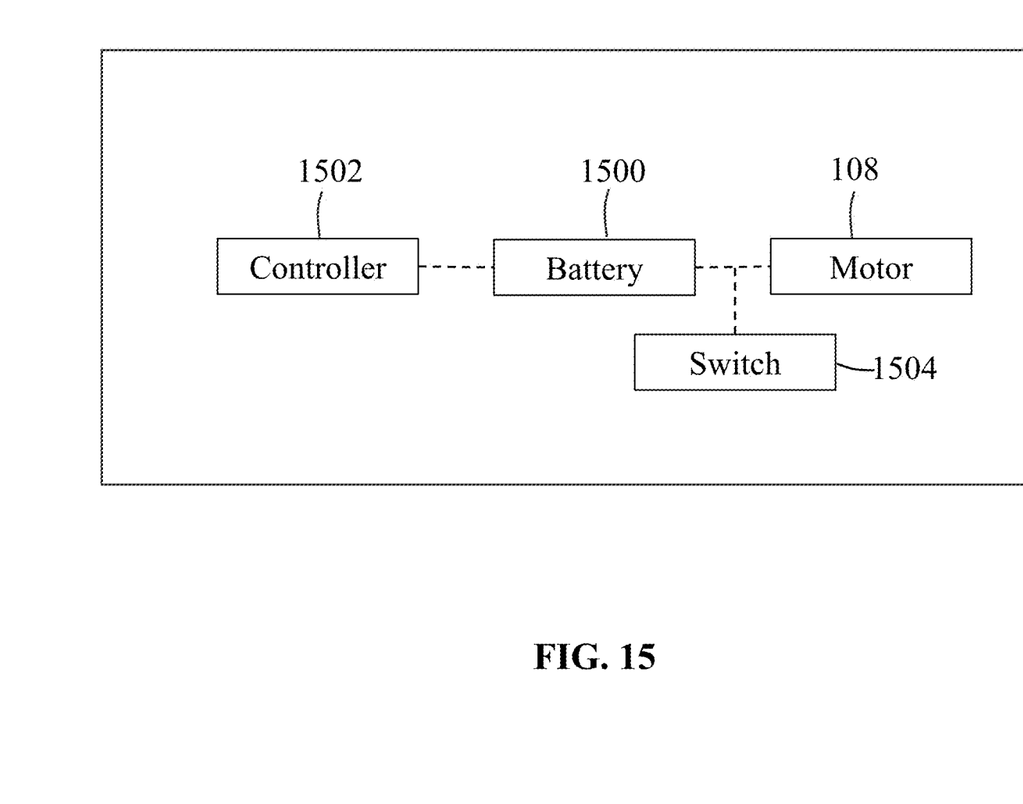
FIG. 15 depicts a schematic block diagram depicting electrical components used in the handheld vacuum assembly in accordance with one embodiment of the present invention.

The battery 1500 is preferably a 12-14V (2500-5000 mAH) lithium-ion battery that may be rechargeable. The motor 108 may generate a vacuum within a range of 4-10 Kpa, preferably around at least 4.5 Kpa, or otherwise at a vacuum pressure sufficient to remove insects and other similar organisms within a range of 15-30 cm from the distal tip 204 of the funnel member 110. The entire assembly 100 preferably weighs less than 11*b*. The compact size and dimensions of the assembly 100 make it ideal for small cleaning spaces without having to use a large upright vacuum cleaner that may be too bulky, heavy, large, or far away to conveniently and repeatedly use on such small areas and organisms. The vacuum body 102 also includes a handle member 104 of a shape and size to be grasped by a user's hand and held for use.

Figure 2:
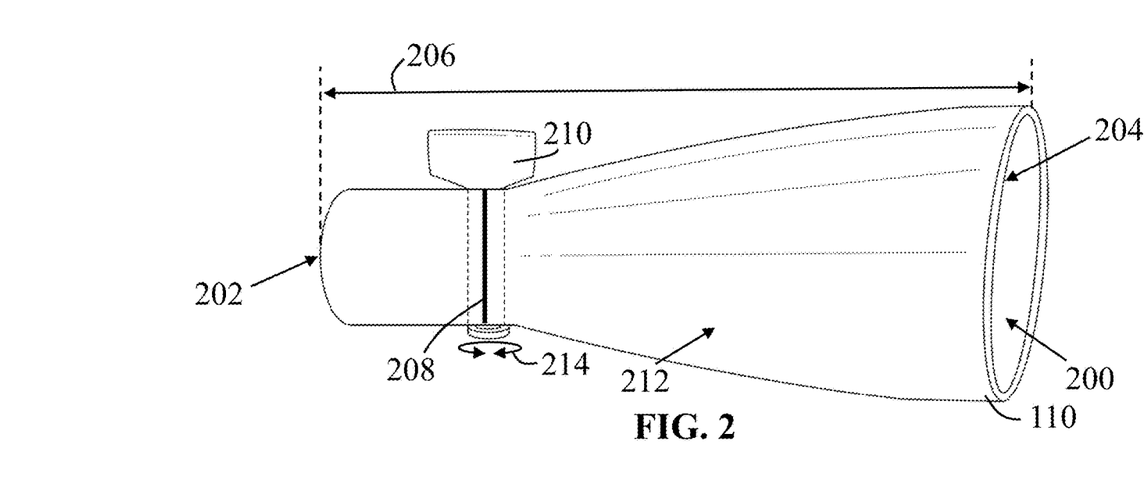
FIG. 2 depicts a perspective view of a funnel member utilized with the handheld vacuum assembly in accordance with one embodiment of the present invention.
Figure 3:
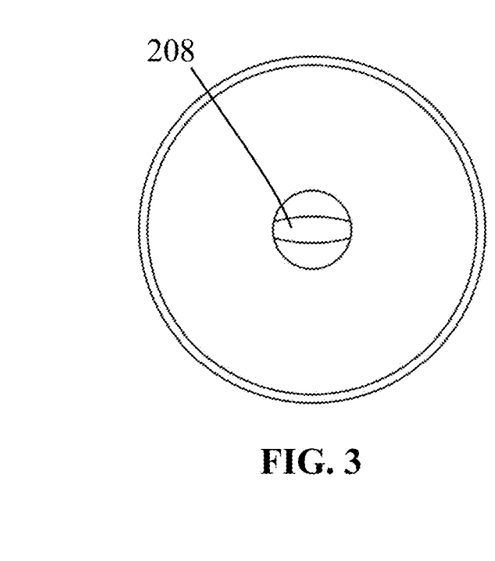
FIG. 3 depicts a top plan view of the funnel member in FIG. 2 with a valve disposed therein in an exemplary open position in accordance with one embodiment of the present invention.

The vacuum body 102 can also be seen defining a suction chamber 106 where debris and other material is generally housed and kept. To that end, the wall(s) of the vacuum body 102 defining the suction chamber 106 may be enclosed and configured to receive or be formed with the funnel member 110, i.e., the funnel member 110 is coupled to the vacuum body 102 and, in some embodiments, may be frictionally coupled to the vacuum body 102 and removable by the user upon using approximately 1-3 lbf. As used herein, the term "wall" is intended broadly to encompass continuous structures, as well as, separate structures that are coupled together so as to form a substantially continuous external surface. With reference to FIGS. 1-3, the funnel body 102 may include the distal tip 204 (or "second end") that defines a funnel opening that is preferably enclosed of a deformably resilient polymeric material, e.g., an elastic natural rubber, that prevents damages to surrounding objects the user may contact to vacuum insects. Having a deformably resilient tip of the funnel member 110 is particularly advantageous to establishments having breakable objects like glass bottles and other containers. The funnel member 110 defines a suction channel 200 spanning from the funnel opening and preferably the entire length 206 of the funnel member 110. Said differently, the funnel member 110 may include a first end 202 opposing the distal tip 202 of the funnel member 110 and a funnel length 206 (of approximately 12-22 cm) separating the first and second ends 202, 204 of the funnel member 110.

The funnel member 110 is preferably of a conical shape with a diameter at the distal tip 204 of the funnel member 110 greater than a diameter of the funnel member 110 at the first end 202. The conical shape facilitates in capturing a greater number of insects and generates a higher vacuum pressure gradient more proximal to the first end 202 of the funnel member 110 (which is particularly beneficial when using the valve 1300 depicted in FIG. 13). The funnel member 110 may be partially conical or entirely conical. The funnel member 110 is beneficially removably couplable to the vacuum body 102 along the funnel length 206, preferably proximal (i.e., at or near, within 10% of the overall length) to the first end 202. The funnel member 110 beneficially includes a male-female coupling configuration with the body 102 and proximal to the suction chamber 106. The suction channel 200 is located downstream of the suction chamber 106 and defies a suction channel diameter and a suction channel area that is a function of the suction channel diameter. As the funnel member 110 may be conical, those of skill in the art will appreciate the suction channel area may vary along the funnel length 206.

To effectively retain insects after vacuumed, the assembly 100 may beneficially utilizes one or more valve(s) that are designed to completely block or substantially inhibit the insects from flying out the funnel member 110 or otherwise entering the suction chamber 106. The valve(s) may be biased in a closed position when not in use to prevent captured insects from escaping and may be disposed on one or both of the ends 202, 204, or along the funnel length 206. In one embodiment, the valve(s) may be biased with a weight, spring, or other biasing mechanism to keep them in a closed position when the motor 108 is not generating the vacuum. In another embodiment, the valve(s) may be absent altogether, as the assembly 100 will beneficially just utilize the adhesive-based filter assembly 112. In some embodiments, the valve(s) may come in the form of a plug configured to fasten or otherwise directly couple with an inside surface of the funnel member 110 defining the suction channel 200.

Figure 14:
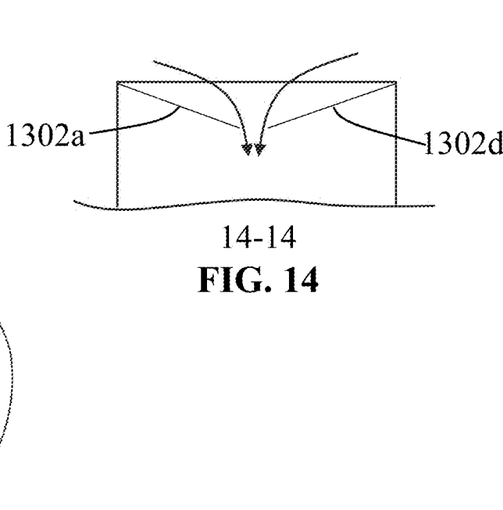
FIG. 14 depicts a fragmentary sectional view of the funnel member along section line 14-14 in FIG. 13.

For example, the valve 208 best depicted in FIGS. 1-3 may be rotatably coupled to the vacuum body 102 and includes a bearing and/or fastener at one end and a handle member 210 projecting outwardly from an outer surface 212 of the funnel member 110 and operably configured to manually place the valve 208 in a valve translation path 214 (exemplified with arrow 214 and which may include a curved path, linear path, or curvilinear path). The handle member 210 may be wider than the valve designed to inhibit flow in the suction channel 200. The valve 208 can be seen in FIG. 2 in an exemplary closed position (with solid line) and an exemplary open position (with dashed lines), wherein the open position permits the flow of insects through the suction channel 200 and into the suction chamber 106. FIG. 3 depicts the valve 208 turned manually (180° from the closed position in FIG. 2) to an open position to permit the flow of air and insects into the suction chamber 106. In an alternative embodiment, the valve 1300 best depicted in FIGS. 13-14 may include a plurality of valve flaps 1302*a-n* (that preferably triangular) that are inherently biased in the closed position and operably configured to be placed in the open position when the motor 108 generates the vacuum downstream in the suction chamber 106. The letter "n" represents any number greater than one.

Said another way, the plurality of valve flaps 1302*a-n* may be of a rigid or flexible material, e.g., a PVC or other polymeric material, that statically remains in the closed position and/or form a horizontal plane until acted on by an external forced, e.g., the vacuum generated by the motor 108 and that is counter to said horizontal plane. Said differently, regardless the type of valve and when utilized, the valve is disposed within the suction channel 200 and operably configured to have an open position along the valve translation path and a closed position along the valve translation path with the valve blocking a greater amount of the suction channel area than when the valve is in the open position. In one embodiment, the closed position of the valve(s) is the result of the valve(s) blocking at least 95% of the suction channel area in which the valve(s) is/are placed and the open position may be blocking half of the suction channel area or blocking approximately 20-50% of the suction channel area. In preferred embodiments, the plurality of valve flaps 1302a-n are disposed proximal to the first end 202 of the funnel member 110 where the pressure gradient is increased. As such, the vacuum is extinguished, the valve(s) may be selectively or automatically closed inhibiting or preventing insects from existing from the suction chamber 106 and/or suction channel 200. In preferred embodiments, the plurality of valve flaps 1302a-n define a plurality of tightly spaced slits between them that enable the plurality of valve flaps 1302a-n to flex and be placed in the open position, wherein the tightly spaced slits may be less than approximately 0.1 mm or have no spacing between adjacent valve flaps 1302a-n. This can be best seen in FIG. 13.

In lieu of the valve(s) or preferably in addition to the valve(s), the assembly 100 utilizes a specially designed filter assembly 112 disposed upstream of the suction channel 200, downstream of the motor 108, and having a porous membrane member 114 capable of permitting air and other debris smaller than insects to pass therethrough. Beneficially, however, the filter assembly 112 utilizes one or more adhesive strip(s) to capture and retain vacuumed insects in the suction chamber 106 to the adhesive strip(s). With reference to FIG. 1 and FIGS. 4-12 and in one embodiment, the filter assembly 112 has a filter cap 116 selectively removably coupled to the porous membrane member 114 and includes a plurality of selectively removable strips 500a-n disposed thereon, wherein each of the plurality of selectively removable strips 500a-n have an adhesive surface oriented in a direction facing the distal tip 204 to capture and retain the incoming insects thereon.

More specifically, the porous membrane member 114 includes an annular upper surface 700 defining an upper aperture 702 and a lower annual surface 900 opposing the annular upper surface 700. The porous membrane member 114 may be of a cylindrical shape that is sized to be received within the suction chamber 106, preferably in a tight fit or frictionally and/or compressively coupling configuration with respect to the walls of the body 102 defining the suction chamber 106. The annular upper surface 700 and the center channel of the porous membrane member 114 have a meshed filtering grate 118 disposed therein. The meshed filtering grate 118 may be made of a rigid material, e.g., stainless steel, aluminum, polycarbonate, etc., that defines apertures sufficient to permit incoming air to pass therethrough (to the porous membrane member 114) yet small enough to prevent insects such as whiteflies, fungus gnats, blackflies, *thrips*, fruit flies, midges, and other flying insects from passing therethrough. Siad differently, each of the aperture(s) defined by the mesh filtering grate 118 may be approximately 1-2 mm in diameter.

The mesh filtering grate 118 may be a conical shape and include a flange 1100 that permits the grate 118 to seat in the porous membrane member 114. To that end, the porous membrane member 114 can be seen also have annular support upper disk and a lower annular support disk that each directly couple to and support the more flexible membrane. The mesh filtering grate 118 is important to permit airflow when the outer perimeter and/or circumference of the porous membrane member 114 is flush against the walls of the vacuum body 102.

Figure 4:
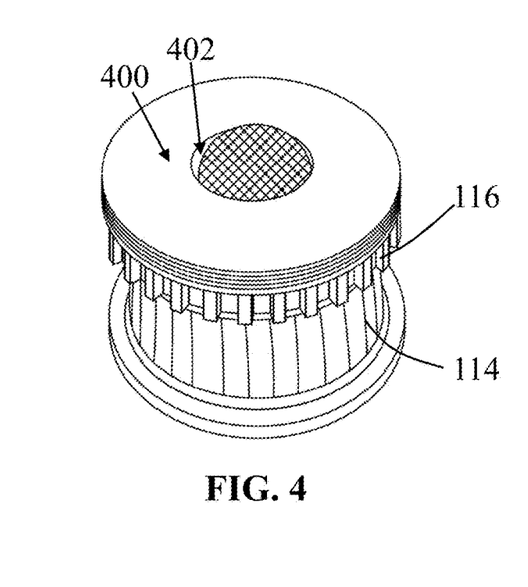
FIGS. 4-7 depict perspective views of a filter assembly for the handheld vacuum assembly in accordance with one embodiment of the present invention.
Figure 5:
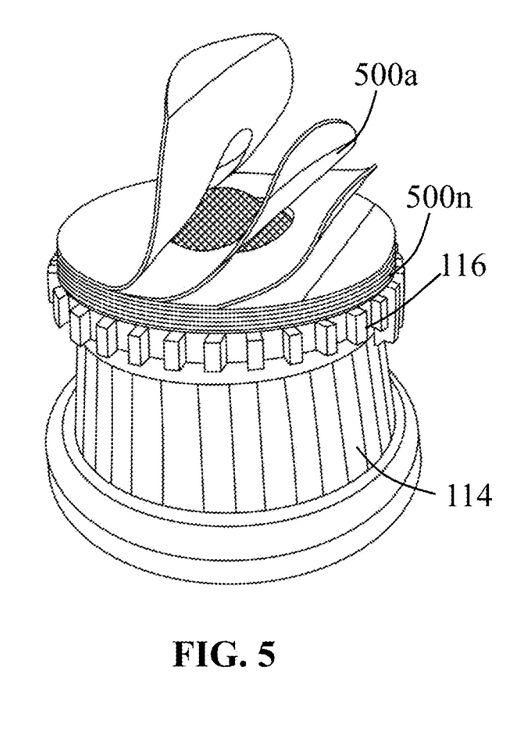
Figure 6:
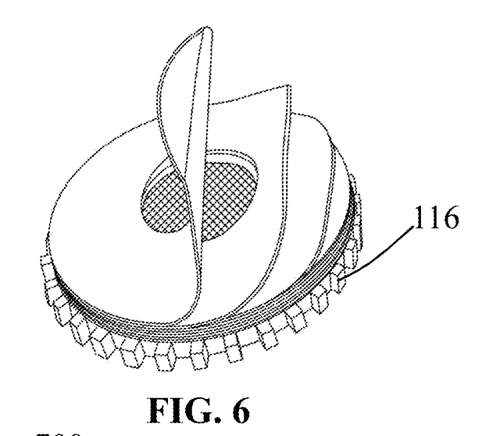
Figure 7:
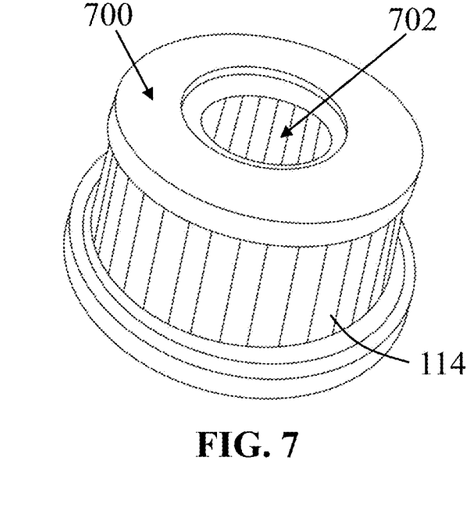
Figure 8:
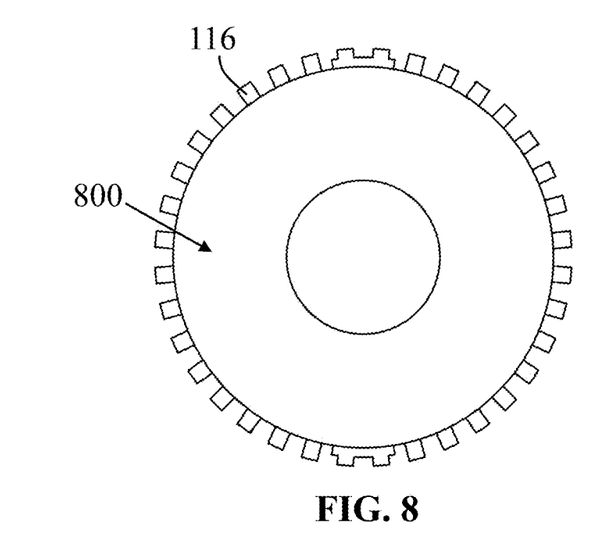
FIGS. 8-10 depict top and bottom plan views and an elevational side of the filter assembly for the handheld vacuum assembly in accordance with one embodiment of the present invention.
Figure 9:
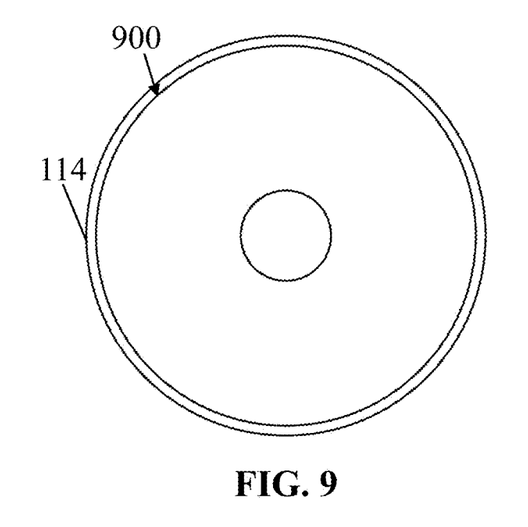
Figure 10:
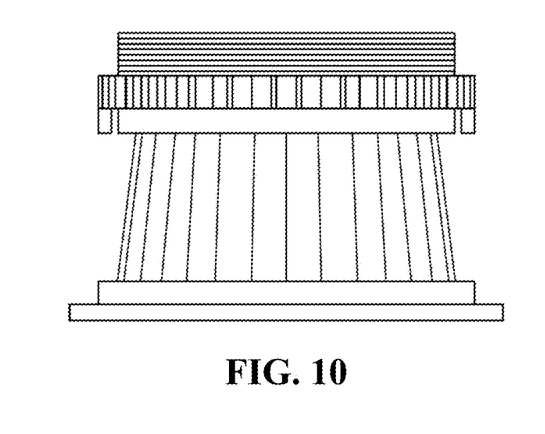

In one embodiment and with reference to FIG. 4 and FIGS. 7-8, the annular upper surface 700 is of a hook and/or a loop configuration and the annular bottom surface 800 of the cap 116 is also of an opposite hook and/or loop configuration of the annular upper surface 700 to enable a hook-and-loop coupling configuration. The annular bottom surface 800 of the cap 117 defining a bottom aperture 402 with the meshed filtering grate 118 also disposed therein and preferably also in a flush configuration with the circumference of the cap 116 defining the annular bottom surface 800. The annular upper surface 700 of the porous membrane member 114 and the annular bottom surface 800 of the cap 116 are selectively removably coupled in the hook-and-loop coupling configuration. The cap 116 can also be seen having a plurality of spaced flanges surrounding the circumference of the cap 116 that permit airflow (when not continuously flush around the circumference) and enable the cap 116 to be removed from the porous membrane member 114 when needed.

Figure 11:
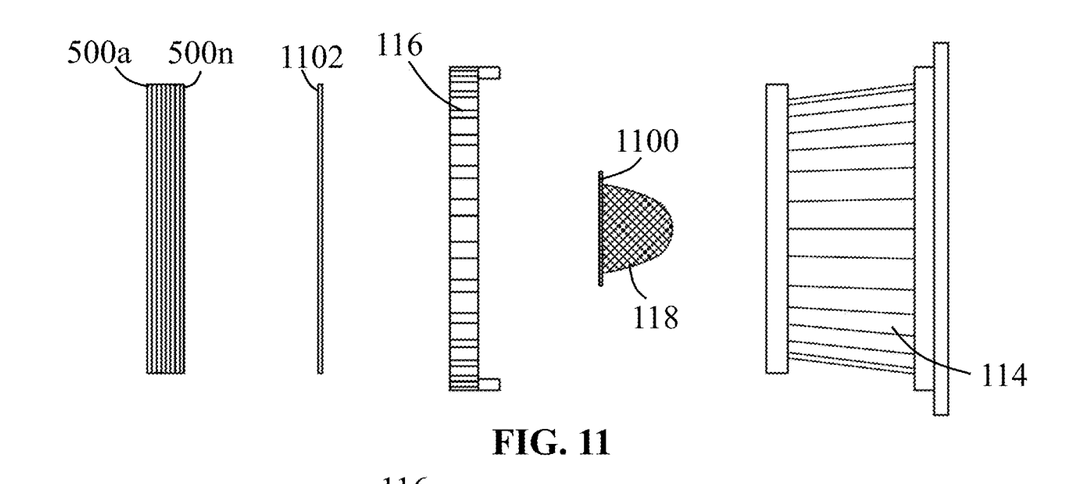
FIGS. 11-12 depict exploded and cross-sectional exploded views of the filter assembly for the handheld vacuum assembly in accordance with one embodiment of the present invention.
Figure 12:
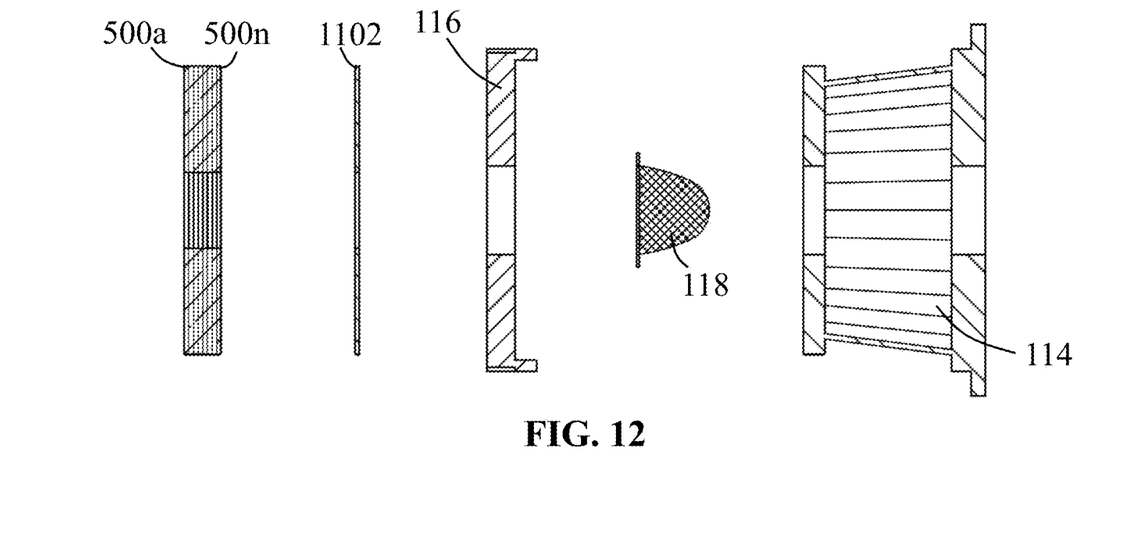

The cap 116 can also be seen having the plurality of selectively removable strips 500a-n stacked upon each other in a serial configuration, wherein each of the opposing sides of the removable strips 500a-n have the adhesive disposed thereon, i.e., double-sided strips. The adhesive may be composed of a petroleum resin material, e.g., 1-3 parts of C5 petroleum resin, 2-4 parts of abietic resin, 1-3 parts of castor oil, 2-3 parts of polybutylene, and 0.02-0.1 part of anti-aging agent. Other adhesives configured to trap insects thereon, however, may be utilized. With reference briefly to FIGS. 11-12, the plurality of selectively removable strips 500a-n may be attached to the filter cap 116 with a hook-and-loop layer 1102 or, preferably, adhesive that bonds the last strip 500n to the filter cap 116.

Each of the selectively removable strips 500a-n may be of a diameter corresponding with a diameter of the suction chamber 106, i.e., the same or slightly less or greater than (within 10% variance). The top layer over the plurality of removable strips 500a-n may be of a paper release liner that permits easy release from the adhesive strips. Each of the plurality of selectively removable strips 500a-n may also define an aperture with a meshed filtering grate 118 disposed therein, thereby preventing or inhibiting an insect from entering the suction cavity 106. As such, the assembly 100 is operably configured to suck in and retain insects, such as whiteflies, fungus gnats, blackflies, *thrips*, fruit flies, midges and other flying insects, which may become a nuisance in an enclosed space such as a home, office, or bar.

More specifically, the user may begin by attaching the funnel member 110 to the body 102 and, when applicable, manipulating the valve so it is placed in the open position. The user may then insert and attach the filter cap 116 to the porous membrane member 114 and, when applicable, remove the release liner from the top of the plurality of strips 500a-n exposing the adhesive, which may be continuously or discontinuously around the surface 400 of the strips. Then, the user may activate the motor 108 to generate a vacuum within suction chamber 106 and suction channel 200 of the funnel member 110 drawing in insects and, in some embodiments, placing the valve in the open position. When the user is finished, the user may deactivate the motor 108 and, when applicable, manually place the valve in the closed position or have the valve be automatically placed in the closed position keeping the insects in or around the suction chamber 106 or otherwise trapped therein. The user may then reactive the motor 108 and/or peel off the upper-most strip and exposing the adhesive on the strip below said upper-most strip. This may continue until all strips 500*a-n* (wherein they may be approximately 10-30) are removed and the user may then replace the entire filter cap 116 with a new filter cap 116 having new strips 500*a-n* disposed thereon. In some embodiments, the porous filtering member 114 may have removable strips surrounding said filtering member 114 on the periphery.

Although a specific order of executing the steps of the assembly 100 have been described and/or shown, the order of executing the steps may be changed relative to the order shown in certain embodiments. Also, two or more steps shown or described as occurring in succession may be executed concurrently or with partial concurrence in some embodiments. Certain steps may also be omitted for the sake of brevity. In some embodiments, some or all of the process steps can be combined into a single process.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above-described features.

What is claimed is:

1. A handheld vacuum assembly for the capture and collection of small insects comprising:
   a vacuum body having a handle member and defining a suction chamber;
   a motor coupled to the vacuum body and operably configured to generate a vacuum downstream in the suction chamber;
   a battery coupled to the vacuum body and electrically coupled to the motor;
   a funnel member coupled to the vacuum body, having a distal tip defining a funnel opening, and defining a suction channel spanning from the funnel opening, located downstream of the suction chamber, and defining a suction channel diameter and a suction channel area that is a function of the suction channel diameter;
   a valve disposed within the suction channel and operably configured to have an open position along a valve translation path and a closed position along the valve translation path with the valve blocking a greater amount of the suction channel area than when the open position; and
   a filter assembly disposed upstream of the suction channel, downstream of the motor, having a porous membrane member, having a filter cap selectively removably coupled to the porous membrane member and having a plurality of selectively removable strips disposed thereon and each having an adhesive surface oriented in a direction facing the distal tip.

2. The handheld vacuum assembly according to claim 1, wherein the funnel member further comprises:
   a first end opposing the distal tip of the funnel member and a funnel length separating the first end and the distal tip of the funnel member, wherein the funnel member is of a conical shape with a diameter at the distal tip greater than a diameter of the funnel member at the first end.

3. The handheld vacuum assembly according to claim 1, wherein the distal tip is of a deformably resilient polymeric material.

4. The handheld vacuum assembly according to claim 1, wherein the filter cap is selectively removably coupled to the porous membrane member with a hook-and-loop coupling configuration.

5. The handheld vacuum assembly according to claim 4, further comprising:
   an annular upper surface of the porous membrane member and defining an upper aperture;
   a meshed filtering grate disposed in the upper aperture of the porous membrane member; and
   an annular bottom surface of the cap defining a bottom aperture with the meshed filtering grate disposed therein, wherein the annular upper surface of the porous membrane member and the annular bottom surface of the cap are selectively removably coupled in the hook-and-loop coupling configuration.

6. The handheld vacuum assembly according to claim 1, wherein the plurality of selectively removable strips are each of a diameter corresponding with a diameter of the suction chamber.

7. The handheld vacuum assembly according to claim 6, wherein each of the plurality of selectively removable strips define an aperture with a meshed filtering grate disposed therein.

8. The handheld vacuum assembly according to claim 1, wherein the valve is coupled to a handle member projecting outwardly from an outer surface of the funnel member and operably configured to manually place the valve in the valve translation path.

9. The handheld vacuum assembly according to claim 1, wherein the valve further comprises:
   a plurality of valve flaps inherently biased in the closed position and operably configured to be placed in the open position when the motor generates the vacuum downstream in the suction chamber.

10. A handheld vacuum assembly for the capture and collection of small insects comprising:
    a vacuum body having a handle member and defining a suction chamber;
    an electrical motor coupled to the vacuum body and operably configured to generate a vacuum downstream in the suction chamber;
    a funnel member coupled to the vacuum body, having a distal tip defining a funnel opening, and defining a suction channel spanning from the funnel opening and located downstream of the suction chamber; and
    a filter assembly disposed upstream of the suction channel, downstream of the motor, having a porous membrane member, having a filter cap selectively removably coupled to the porous membrane member and having a plurality of selectively removable strips disposed thereon and each having an adhesive surface oriented in a direction facing the distal tip, each defining an aperture with a meshed filtering grate disposed therein, and each of a diameter corresponding with a diameter of the suction chamber.

11. The handheld vacuum assembly according to claim 10, further comprising:
    a suction channel diameter defined by the funnel member and a suction channel area of the funnel member that is a function of the suction channel diameter; and
    a valve disposed within the suction channel and operably configured to have an open position along a valve translation path and a closed position along the valve translation path with the valve blocking a greater amount of the suction channel area than when the open position.

12. The handheld vacuum assembly according to claim 11, wherein the valve is coupled to a handle member projecting outwardly from an outer surface of the funnel member and operably configured to manually place the valve in the valve translation path.

13. The handheld vacuum assembly according to claim 11, wherein the valve further comprises:
   a plurality of valve flaps inherently biased in the closed position and operably configured to be placed in the open position when the motor generates the vacuum downstream in the suction chamber.

14. The handheld vacuum assembly according to claim 11, wherein the funnel member further comprises:
   a first end opposing the distal tip of the funnel member and a funnel length separating the first end and the distal tip of the funnel member, wherein the funnel member is of a conical shape with a diameter at the distal tip greater than a diameter of the funnel member at the first end.

15. The handheld vacuum assembly according to claim 11, wherein the distal tip is of a deformably resilient polymeric material.

16. The handheld vacuum assembly according to claim 10, wherein the filter cap is selectively removably coupled to the porous membrane member with a hook-and-loop coupling configuration.

17. The handheld vacuum assembly according to claim 16, further comprising:
   an annular upper surface of the porous membrane member and defining an upper aperture with the meshed filtering grate disposed in the upper aperture of the porous membrane member; and
   an annular bottom surface of the cap defining a bottom aperture with the meshed filtering grate disposed therein, wherein the annular upper surface of the porous membrane member and the annular bottom surface of the cap are selectively removably coupled in the hook-and-loop coupling configuration.

18. The handheld vacuum assembly according to claim 10, further comprising:
   a battery coupled to the vacuum body and electrically coupled to the motor.

\* \* \* \* \*